Sept. 6, 1927.
J. S. BURWELL
SHOCK ABSORBER
Filed Oct. 1, 1925
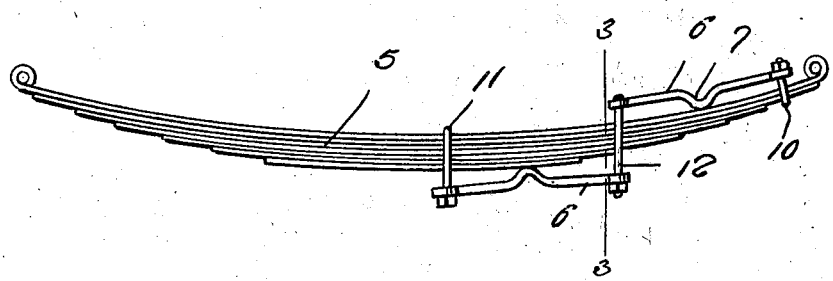
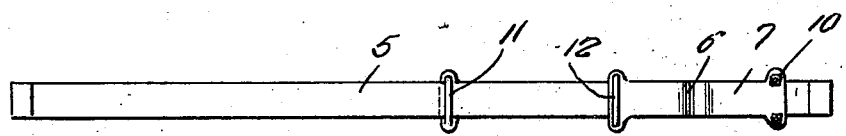
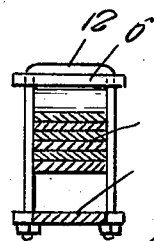
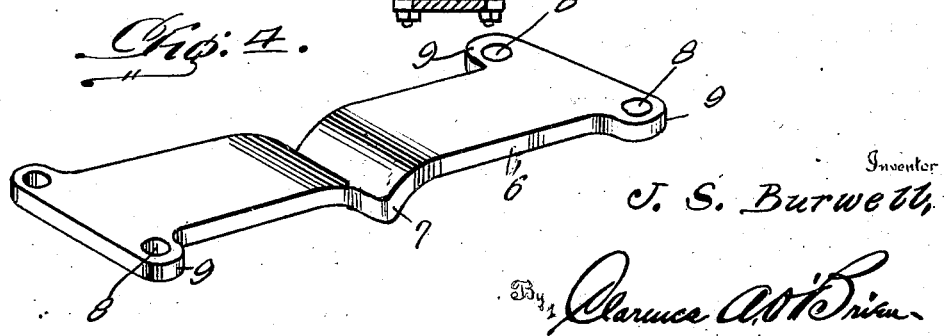
Inventor
J. S. Burwell,
By Clarence A. O'Brien
Attorney Patented Sept. 6, 1927.

1,641,572

UNITED STATES PATENT OFFICE.

JAY SAMUEL BURWELL, OF SHARON, PENNSYLVANIA.

SHOCK ABSORBER.

Continuation of application Serial No. 750,455, filed November 17, 1924. This application filed October 1, 1925. Serial No. 59,863.

The present invention relates to a shock absorber, and has for its principal object to provide a simple and efficient device of this nature which will be thoroughly reliable in use for absorbing the shocks incident to the travel of a vehicle over the roads.

Another important object of the invention is to provide a shock absorber of this nature which may be quickly and easily applied to a spring, and which may be manufactured at exceedingly low cost.

Another important object of the invention is to provide a shock absorber of this nature which is strong and durable, not likely to easily become out of order, and otherwise well adapted to the purpose for which it is designed.

With the above and numerous other objects in view as will appear as the description proceeds, the invention resides in certain novel features of construction, in the combination and arrangement of parts as will be hereinafter more fully described and claimed.

This application is a continuation of the application filed by me on the 17th day of November, 1924, and bearing Serial No. 750,455.

In the drawing:—

Figure 1 is a side elevation of a vehicle semi-elliptical spring, showing my improved shock absorber associated therewith.

Figure 2 is a top plan view thereof,

Figure 3 is a section taken therethrough substantially on the line 3—3 of Figure 1, and Figure 4 is a detail perspective of one of the plates incident to the device.

Referring to the drawing in detail, it will be seen that I have illustrated an ordinary semi-elliptical vehicle spring at 5. A pair of plates 6 are provided with laterally bent intermediate portions 7, and openings 8 provided in ears 9, at the ends thereof.

One of these plates is disposed on the concave or upper portion of the spring 5 with the offset intermediate curved portion 7 in abutment therewith. One end of this plate is fixed to the spring by means of a U-bolt 10 which passes through the openings 8 at that end of the plate. The other plate is disposed on the convex or lower portion of the spring 5, and has its intermediate portion in engagement with the plate. The end of the latter mentioned plate is held in place by a U-bolt 11 passing through the openings 8. The adjacent ends of the plates are connected together by a U-bolt 12 passing through the openings in said ends.

From the above description it will be seen that as the vehicle passes over a bump in the road, the spring 5 is free to flex so as to tend to straighten out, but the rebound will be taken care of since the spring is limited in flexing in the opposite direction, that is to increase the curvature of the spring beyond its normal curvature.

It is thought that the construction, operation, and advantages of the invention will now be apparent. The plates are very easily applied to the spring, and if desired, may be manufactured directly with the spring.

The present embodiment of the invention has been disclosed merely by way of example since in actual practice it attains the features of advantage enumerated as desirable in the statement of the invention, and the above description. It will be apparent that numerous changes in the details of construction, and in the combination and arrangement of parts may be resorted to without departing from the spirit or scope of the invention as hereinafter claimed or sacrificing any of its advantages.

Having thus described the invention, what I claim is:—

1. In combination, a curved spring, a plate having an offset curved intermediate portion abutting the concave side of the spring, a second plate similar to the first plate having its intermediate portion abutting the convex surface of the spring, means engaging the adjacent ends of said plates together, and means fixing the other ends of said plates to the spring.

2. As a new article of manufacture, a plate for a shock absorber including an elongated flat body having an intermediate laterally curved portion, ears extending laterally from the edges of the plate adjacent its ends and provided with apertures.

3. In combination, a curved spring, a pair of plates, one plate being disposed on the concave face of the spring, the other plate disposed on the convex face thereof, said plates having their intermediate portions curved laterally to abut the spring, a U-bolt engaging the adjacent ends of the plates and other U-bolts engaging the free ends of the plates.

4. In combination, a curved spring, a plate extending along one side thereof and having one end fixed thereto, a second plate extending along the other side of the spring and having one end fixed thereto, said plates being disposed adjacent different portions of the spring, and means for holding the other adjacent ends of said plates together.

5. In combination, a curved spring, a plate extending along one side thereof and having one end fixed thereto, a second plate extending along the other side of the spring and having one end fixed thereto, said plates being disposed opposite different portions of said spring, and means for holding the other adjacent ends of said plates together, each plate being provided with an offset curved intermediate portion abutting the adjacent side of the spring while the ends of the plates are normally spaced from the spring.

6. In combination, a curved spring, a plate mounted to extend along one side thereof, a second plate mounted to extend along the other side of the spring, said plates being disposed opposite different portions of the length of said spring, and means for holding the adjacent ends of said plates together.

7. As a new article of manufacture, a spring shock absorber plate including an elongated flattened body having an intermediate laterally curved portion for engaging the spring, the longitudinal length of the body being considerably less than the length of one-half of the spring with which the laterally curved portion is engaged.

8. In combination, a semi-elliptical spring, a plate including an elongated flat body having an intermediate laterally curved portion engaging the spring, means engaging the spring and the ends of the plate, said ends of said plate being disposed in spaced relation to said spring, the length of said plate being considerably less than the length of one-half of said semi-elliptical spring.

In testimony whereof I affix my signature.

JAY SAMUEL BURWELL.